(12) United States Patent
Heine et al.

(10) Patent No.: US 6,834,150 B2
(45) Date of Patent: Dec. 21, 2004

(54) OPTICAL WAVEGUIDE

(75) Inventors: Frank Heine, Mainhardt (DE); Robert Lange, Backnang (DE); Thomas Schwander, Backnang (DE); Bernd Michael Dicks, Hamburg (DE); Klaus Petermann, Wedel (DE)

(73) Assignees: Robert Bosch GmbH, Stuttgart (DE); Universitaet Hamburg, Hamburg (DE)

( * ) Notice: Subject to any disclaimer, the term of this patent is extended or adjusted under 35 U.S.C. 154(b) by 218 days.

(21) Appl. No.: 09/884,839

(22) Filed: Jun. 19, 2001

(65) Prior Publication Data

US 2002/0006258 A1 Jan. 17, 2002

(30) Foreign Application Priority Data

Jun. 21, 2000 (DE) .......................... 100 29 381

(51) Int. Cl.[7] .......................... G02B 6/02; G02B 6/00; H01S 3/30
(52) U.S. Cl. .................. 385/123; 385/124; 385/142; 372/6
(58) Field of Search .................. 385/123–124, 385/127, 141, 142; 359/341, 341.1, 341.5; 372/6

(56) References Cited

U.S. PATENT DOCUMENTS

| | | | | |
|---|---|---|---|---|
| 4,083,018 A | * | 4/1978 | Yang et al. | 372/41 |
| 5,537,505 A | * | 7/1996 | Borrelli et al. | 372/40 |
| 6,023,479 A | * | 2/2000 | Thony et al. | 372/11 |
| 6,128,430 A | * | 10/2000 | Chu et al. | 385/141 |
| 6,198,870 B1 | * | 3/2001 | Kubota et al. | 359/341.5 |
| 6,226,308 B1 | * | 5/2001 | Samson et al. | 372/40 |
| 6,278,832 B1 | * | 8/2001 | Zagumennyi et al. | 117/12 |
| 6,356,699 B1 | * | 3/2002 | Bartholomew et al. | 313/468 |
| 6,381,392 B1 | * | 4/2002 | Hayden et al. | 372/39 |
| 2002/0041750 A1 | * | 4/2002 | Chacon et al. | 385/141 |
| 2002/0071455 A1 | * | 6/2002 | Heine | 372/6 |

* cited by examiner

*Primary Examiner*—John D. Lee
*Assistant Examiner*—Tina M Lin
(74) *Attorney, Agent, or Firm*—Michael J. Striker

(57) ABSTRACT

An optical waveguide has a core, wherein the core is doped with laser-active ions, and also additionally doped with Ce.

6 Claims, 1 Drawing Sheet

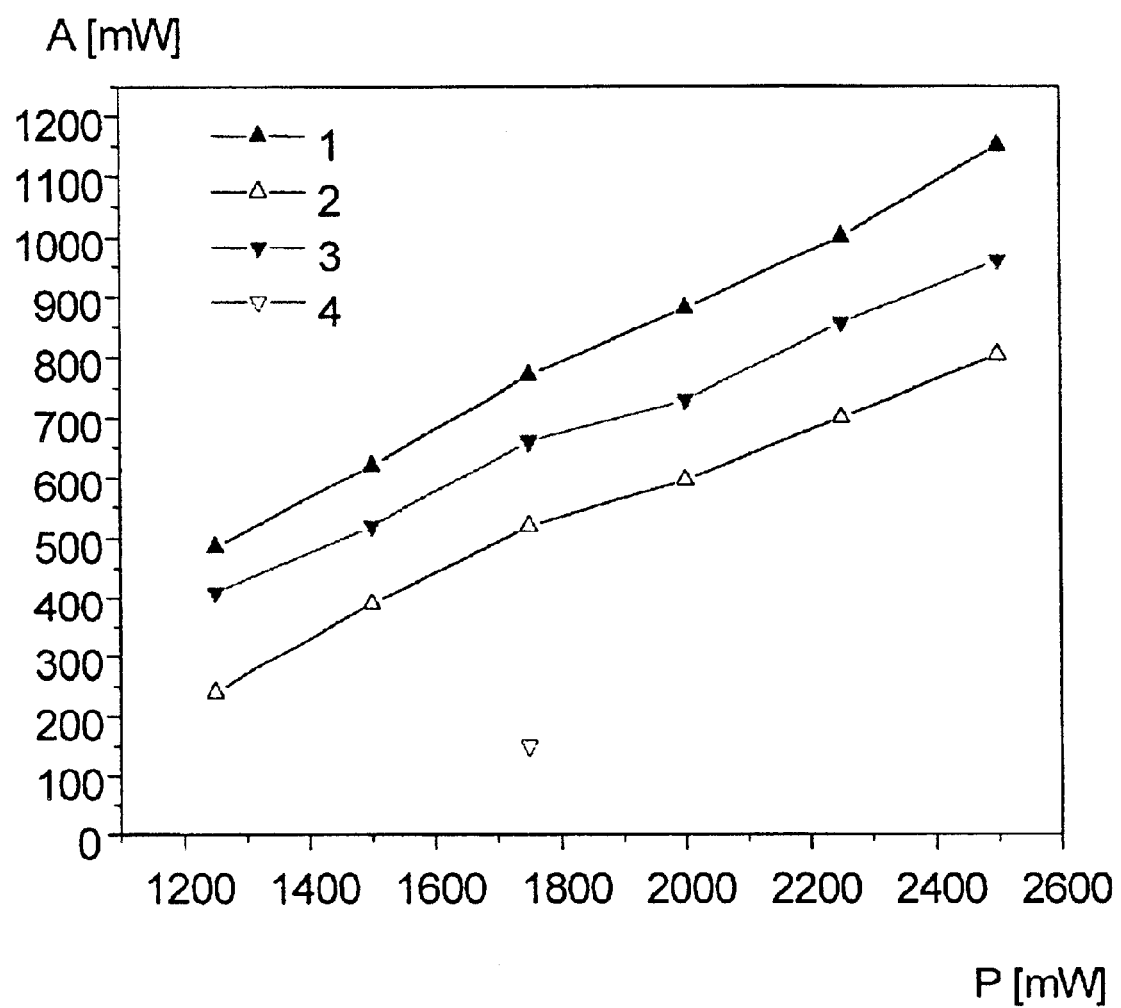

OPTICAL WAVEGUIDE

BACKGROUND OF THE INVENTION

The present invention relates generally to optical waveguides.

The use of fiber lasers and fiber amplifier in the optical information technology is widely expanded. In particular, the erbium-doped fiber amplifiers are known, which have been recommended over last few years in commercial terrestrial systems. These systems have achieved a very high development stage with respect to efficiency in resistance against diverse thermal and weather conditions.

For underwater communications and intersatellite connections, the existing boundary conditions in terrestrial applications lead to radiation damage accumulated over several years of their time of use. They can lead to a slow degradation of the performance up to complete loss of laser or amplifier operation.

Color centers (absorbing centers in visible and near infrared spectral region) in the fibers are responsible for releasing electrons from the atoms of the laser or amplifier materials. These electrons are no longer stationary and can be converted to other atoms in the material and on lattice empty locations in long-term stable centers, which have the spectral broad-band (several hundred nanometers) adsorption. The light power adsorbed in these centers is mainly converted into heat and weakens the use signal which is required for maintaining the laser or amplifier operation.

In the recent time various parameters during production (growth) of the fibers have been researched (pulling speed, temperature, initial materials) as well as the influencing factors of the co-doping required for adjustment of the refraction index profile (for example phosphorus, germanium, aluminum) on the radiation resistance of the fibers. This is disclosed for example in "Radiation-induced Coloring of erbium-doped optical fibers by G. M. Williams, M. A. Putnam, C. G. Askins, M. E. Gingerich, and E. G. Friebele, SPIE Vol. 1791 Optical Material Reliability and Testing 1992; and "Effect of Natural Radioactivity on Optical Fibers of Undersea Cables" by H. Henschel and E. Baumann, Jour. Lightwave Tech, Vol. 14, No. 5, May 1996.

The use of phosphorus has a disadvantageous effect on the radiation strength of fibers, which can reduce the exclusive utilization of geranium against the radiation damages.

Despite this, there are no today convincing solutions for doping with laser-active ions (rare earths with erbium, neodym, ytterbium) for accumulated radiation doses of 50–200 kRAD, which occur during long-time space applications or undersea cables.

The firm Shott suggested passive glasses with Cer-codoping which are not however doped with laser-active ions. These glasses have a relatively low absorptions induced by radiation.

SUMMARY OF THE INVENTION

Accordingly, it is an object of the present invention to provide an optical waveguide which avoids the disadvantages of the prior art.

In keeping with these objects and with others which will become apparent hereinafter, one feature of present invention resides, briefly stated, in an optical waveguide which has a core which is doped with laser-active ions, and which is additionally doped with Cer.

By codoping (admixture) of Cer-ions to the conventionally utilized initial material of a fiber culture, the invention makes possible the elimination of absorption induced by gamma and proton bombardment and thereby connected reduction of the output power.

The invention provides a material combination for less radiation-sensitive fiber laser and amplifier, which makes possible the use of such systems in space and other radiation-loaded environments. With the waveguide of the invention the loss of efficiency induced by the radiation has been efficiently limited to approximately 30% (at 100 kRad $Co^{60}$ dose).

An especial advantage of the invention is that the ion Cer originates from the same chemical group (rare earths) as the laser-active ions. Therefore a doping ability with Cer is always provided when the fiber material can be doped with laser-active ions of the rare earths group.

The efficiency of the Cer-codoping is an object of a further investigation. The cause for the prevention of the color center formation lies however most probably in an engagement of the electrons which are knocked by the radiation action from the atom before they can form a color center. The electrons can be localized on the Cer, or during so-called charge-transfer transition are again transferred back to the initial atom.

The invention can be used for all laser-active ions in fibers of neodym (Nd) erbium (Er) thulium (Tm), holmium (Ho) ytterbium (Yb), praseodym (Pr), and for all fiber initial materials, such as silicate glass, quartz, fluoride glass.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing an example of the inventive optical wave guide.

DESCRIPTION OF THE PREFERRED EMBODIMENTS

The drawings shows, for fiber amplifiers with different doped fibers, the dependency of the initial power from the pump power.

The core of the present invention is an admixture of Cer (for example for silicate glasses in form of $Ce_2O_3$ as an additional doping to the regions which are doped with laser-active ions, in particular central regions (cores) of silicate fibers (quartz fibers).

The curve 3 and the measuring point 4 shown in the drawing refer to an aluminosilicate fiber doped with 0.6 mol % of $Yb_2O_3$ (quartz fiber with aluminum for adjustment of the refraction index profile). Curve 3 shows the conditions without irradiation, while the measuring point 4 was measured after an irradiation with 100 kRAD Gamma ($Co^{60}$).

Curve 1 shows an example of the case of a non-irradiated aluminosilicate fiber (quartz fiber with aluminum for adjustment of the refraction index profile), which was doped with 0.6 mol % $Yb_2O_3$, with a codoping of 0.24 mol % $Ce_2O_3$.

This codoping with 0.24 mol % $Co_2O_3$ corresponds to 40% of the doping with 0.6 mol % $YB_2O_3$. Investigations show that a doping of 5% to 200% with respect to the proportion of the oxide, for example ($Ce_2O_3$ to $Yb_2O_3$ is meaningful.

Curve 2 shows that after irradiation with 100 kRad Gamma (Co$^6$) a drop of the output power of the fiber amplifier by only approximately 30% of the output power measured before the irradiation is obtained, while the comparative fiber not codoped with Cer (the same composition but without Cer) in correspondence with the measuring point 4 after the irradiation can not be operated efficiently as the amplifier, since the damping induced by the color centers was too high. The drop of efficiency is to 20%(measuring point 4) of that of the non-irradiated fiber (curve 3).

Since the addition of Cer has also an influence on the refraction index, therefore with a silicate fiber the core can be codoped also for adjustment of the refraction index profile.

The Yb fiber co-doped with Cer is actually suitable as a component of a power amplifier for light of the wave length 1064 nm in the optical inter satellite communication (data exchange) between two satellites by means of the information which is modulated to the light of a predetermined wave length, which can be freely transmitted between satellites. The power amplifier is located in a transmitter part of a communication satellite.

It will be understood that each of the elements described above, or two or more together, may also find a useful application in other types of constructions differing from the types described above.

While the invention has been illustrated and described as embodied in optical wave guide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An optical amplifier, comprising a component which is an optical waveguide, said optical waveguide including a core, said core being doped with laser-active ions, said core being additionally doped with Cer.

2. An optical power amplifier, comprising a component which is an optical waveguide, including a core, said core being doped with laser-active ions, said core being additionally doped with Cer.

3. A laser, comprising an optical waveguide including a core, said core being doped with laser-active ions, said core being additionally doped with Cer.

4. An optical device which is used under radiation loading, comprising an optical waveguide including a core, said core being doped with laser-active ions, said core being additionally doped with Cer.

5. An optical waveguide, comprising a core, said core being doped with laser-active ions selected from the group consisting of neodymium, thulium, holmium, ytterbium, and praseodymium, said core being additionally doped with Ce for reducing radiation sensitivity, said doping with Ce constitutes 5–200% of a concentration of the laser-active ions in mol %.

6. An optical waveguide as defined in claim 1, wherein the waveguide is formed as a silicate fiber, said core being codoped also for adjusting a refraction index profile.

* * * * *